United States Patent
Yang

(10) Patent No.: US 10,486,254 B1
(45) Date of Patent: Nov. 26, 2019

(54) TOOL HAVING SWITCH WITH SUPPORT FUNCTIONS

(71) Applicant: Pro-Iroda Industries, Inc., Taichung (TW)

(72) Inventor: Cheng-Nan Yang, Taichung (TW)

(73) Assignee: Pro-Iroda Industries, Inc., Taichung (TW)

(*) Notice: Subject to any disclaimer, the term of this patent is extended or adjusted under 35 U.S.C. 154(b) by 0 days.

(21) Appl. No.: 16/103,962

(22) Filed: Aug. 16, 2018

(30) Foreign Application Priority Data

Jul. 24, 2018 (TW) .............................. 107125495 A

(51) Int. Cl.
*B23K 3/02* (2006.01)
*B25F 5/02* (2006.01)

(52) U.S. Cl.
CPC . *B23K 3/02* (2013.01); *B25F 5/02* (2013.01)

(58) Field of Classification Search
CPC .. B23K 3/02; B23K 3/027; B23K 3/08; B25F 5/02
See application file for complete search history.

(56) References Cited

U.S. PATENT DOCUMENTS

| 2,030,238 | A  | * | 2/1936  | Brown ..................... B23K 3/08 |
|           |    |   |         | 126/240                              |
| 9,126,322 | B2 | * | 9/2015  | Yaschur .................... B25F 5/02 |
| 9,873,161 | B2 | * | 1/2018  | Tsai ......................... F21S 9/02 |
| 2008/0179309 | A1 |  | 7/2008  | Markovsky et al.                  |

FOREIGN PATENT DOCUMENTS

| CN | 2650921 Y    | 10/2004 |
| CN | 202752720 U  | 2/2013  |
| CN | 204504447 U  | 7/2015  |
| CN | 205393727 U  | 7/2016  |
| CN | 207071733 U  | 3/2018  |
| EP | 0633663 A1   | 1/1995  |
| TW | M265152 U    | 5/2005  |

* cited by examiner

*Primary Examiner* — David B. Thomas
(74) *Attorney, Agent, or Firm* — Alan D. Kamrath; Karin L. Williams; Mayer & Williams PC

(57) ABSTRACT

A tool having switch with support function includes a main body and a switch. The main body extends along an axis. The switch is slidably mounted on the main body and is slidable between an ON position and an OFF position. The switch includes a base slidably connected to the main body. The switch is adapted to stand on a surface stably, and the main body is able to be supported on the surface by the switch. The switch has a supporting structure which projects from the base and extends transversely to the axis. The supporting structure has an abutting end disposed on a first plane which extends transversely to the axis. When the switch stands on the surface, the surface bears the switch from the supporting structure.

12 Claims, 5 Drawing Sheets

TOOL HAVING SWITCH WITH SUPPORT FUNCTIONS

BACKGROUND OF THE INVENTION

1. Field of the Invention

The present invention relates to a tool and, particularly, to a tool including a switch that allows a user to turn the tool on or off and that is able to be used as a tool support.

2. Description of the Related Art

A soldering iron is a tool which includes a heated tip that is able to supply heat to melt iron so that it can flow into the joint between two workpieces. Because the temperature of the heated tip is very high, the soldering iron is always placed on a soldering iron stand at intervals throughout a soldering operation. The soldering iron stand prevents other objects from being damaged by the heat of the heated tip.

TW Pat. No. M265152 shows a simple soldering iron stand. The soldering iron stand is collapsible for easy storage and transportation, but it is still inconvenient.

The present invention is, therefore, intended to obviate or at least alleviate the problems encountered in the prior art.

SUMMARY OF THE INVENTION

According to the present invention, a tool having switch with support function includes a main body and a switch. The main body has a front end and a rear end and extends from the front end to the rear end along an axis L. The switch is slidably mounted on the main body and is slidable between an ON position and an OFF position parallel to the axis L. The switch is disposed between the front and rear ends of the main body. The switch includes a base slidably connected to the main body. The main body is able to be supported on a surface by a supporting structure of the switch. The supporting structure projects from the base and has an abutting end distal to the base. The supporting structure extends transversely to the axis L and includes the abutting end disposed on a first plane which extends transversely to the axis L. The abutting end is able to stand on the surface stably.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Other objectives, advantages, and new features of the present invention will become apparent from the following detailed description of the invention when considered in conjunction with the accompanied drawings.

DETAILED DESCRIPTION OF THE INVENTION

Figure 1:
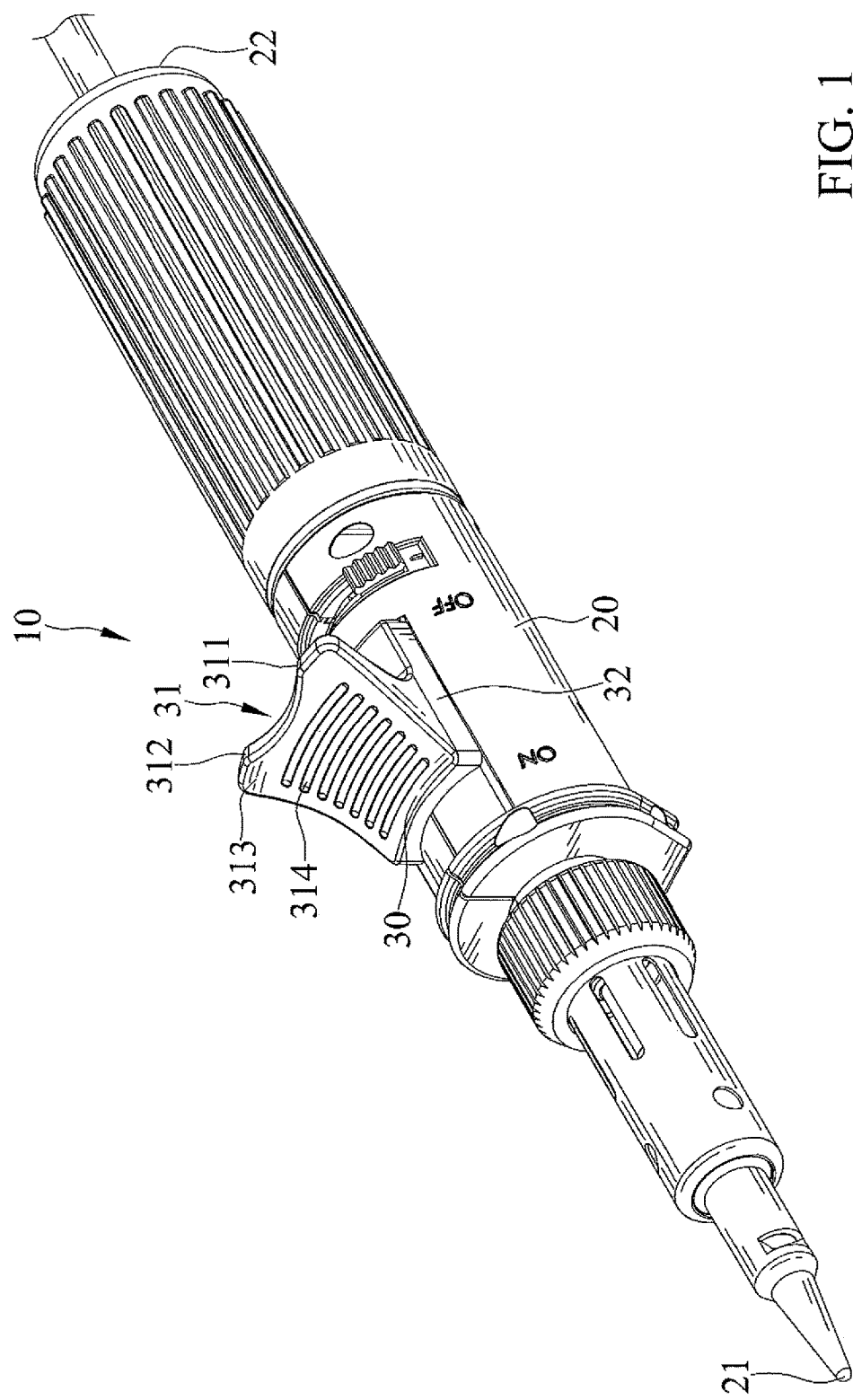
FIG. 1 is a perspective view of a tool having switch with support function in accordance with the present invention, with a switch of the tool in an OFF position.
Figure 2:
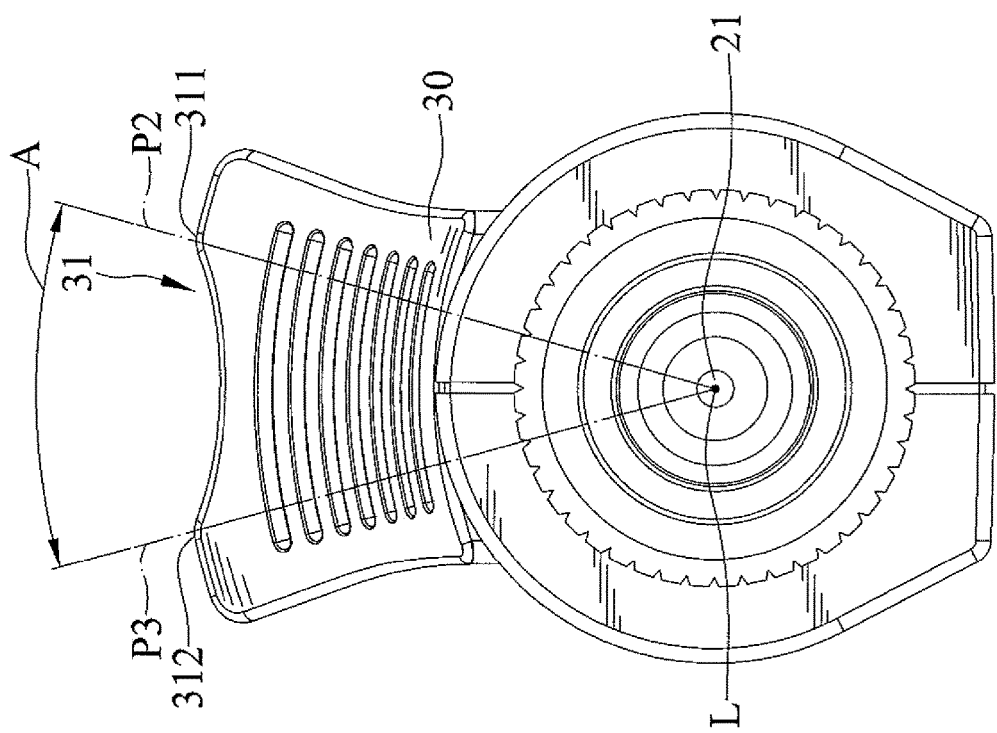
FIG. 2 is a cross-sectional view of the tool of FIG. 1.

FIGS. 1 through 5 show a tool 10 having switch with support function in accordance with the present invention. The tool 10 includes a main body 20 and a switch 30.

The main body 20 has a front end 21 and a rear end 22 and extends from the front end 21 to the rear end 22 along an axis L.

The switch 30 is slidably mounted on the main body 20 and is slidable between an ON position and an OFF position. The switch 30 is disposed between the front and rear ends 21 and 22 of the main body 20. The switch 30 includes a base 32 slidably connected to the main body 20.

The switch 30 is adapted to stand on a surface 90 stably, and the main body 20 is able to be supported on the surface 90 by the switch 30. The switch 30 has a supporting structure 31 which projects from the base 32 and extends transversely to the axis L. The supporting structure 31 has an abutting end disposed on a first plane P1 which extends transversely to the axis L. The abutting end is disposed further from the axis L radially than any point on an outer periphery of the main body 20. The main body 20 has an outer periphery which is distal to the axis L radially at a first distance. The abutting end is distal to the axis L radially at a second distance greater than the first distance.

When the switch 30 stands on the surface 90, the surface 90 bears the switch 30 from the supporting structure 31. The abutting end of the supporting structure 31 standing on the surface 90 has two points of contact on the surface 90 and with a first contact point 311 disposed on a second plane P2 and a second contact point 312 disposed on a third plane P3 respectively. The second and third planes P2 and P3 intersect with the axis L. The second and third planes P2 and P3 have an included angle A therebetween. The included angle is in a range between 20 and 40 degrees.

Figure 3:
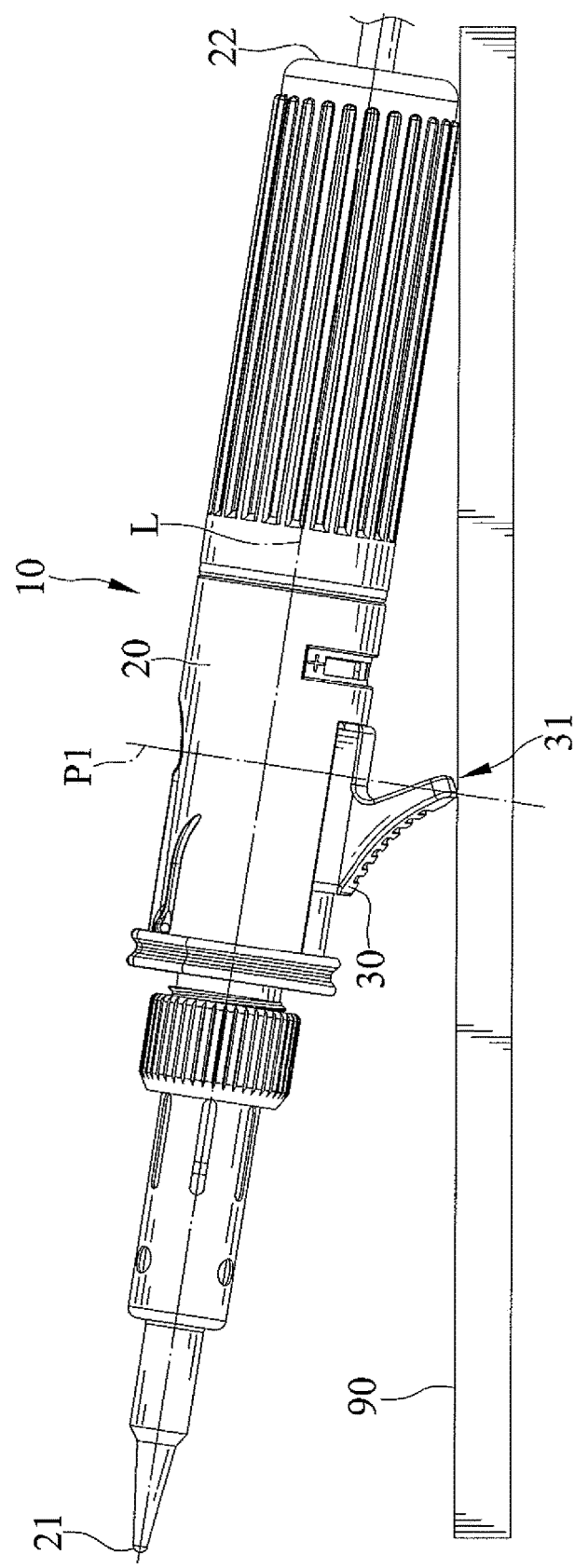
FIG. 3 is a perspective view showing the tool of FIG. 1 in a supported position, with the switch in the OFF position.
Figure 4:
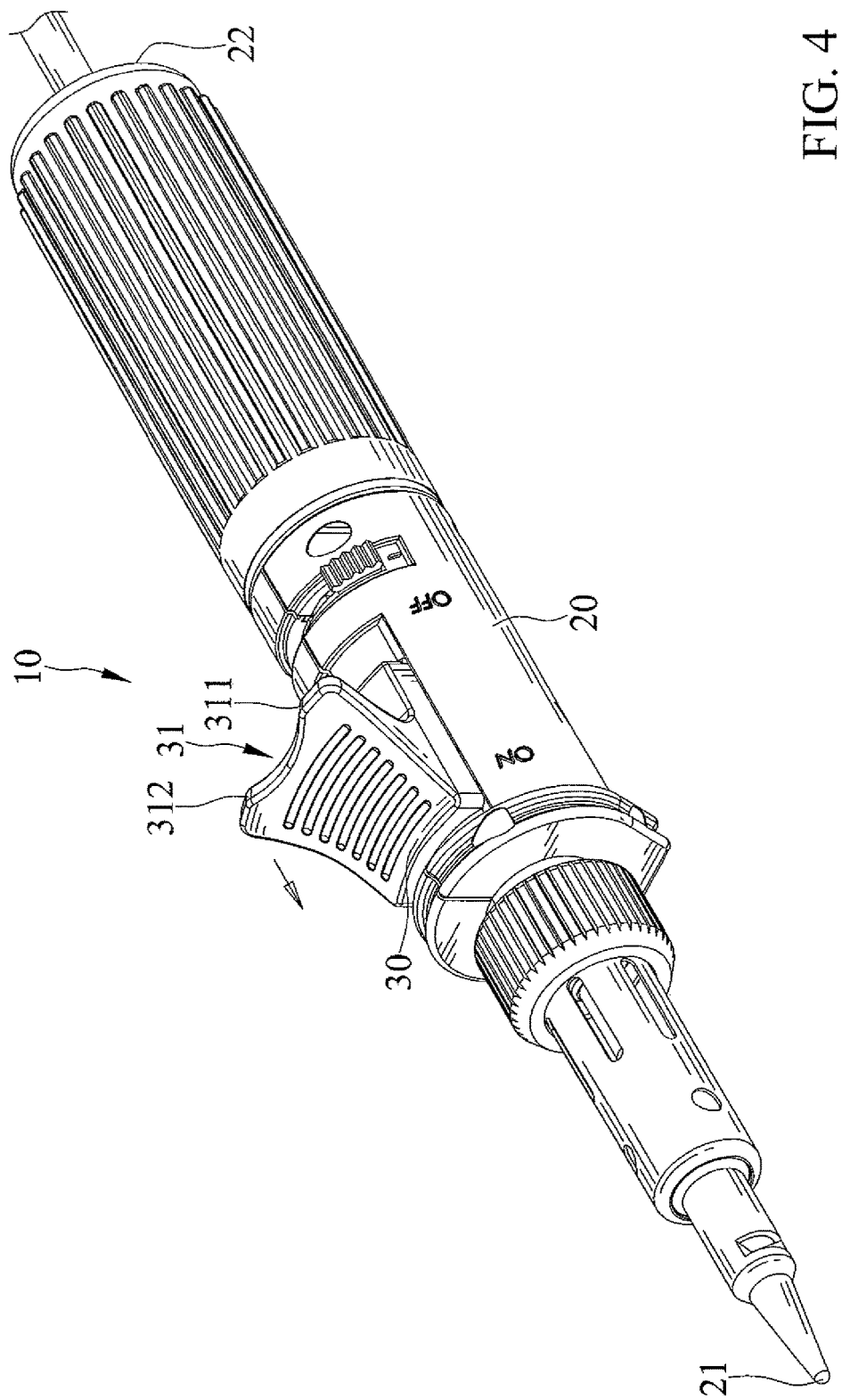
FIG. 4 is another perspective view of the tool of FIG. 1, with the switch in an ON position.
Figure 5:
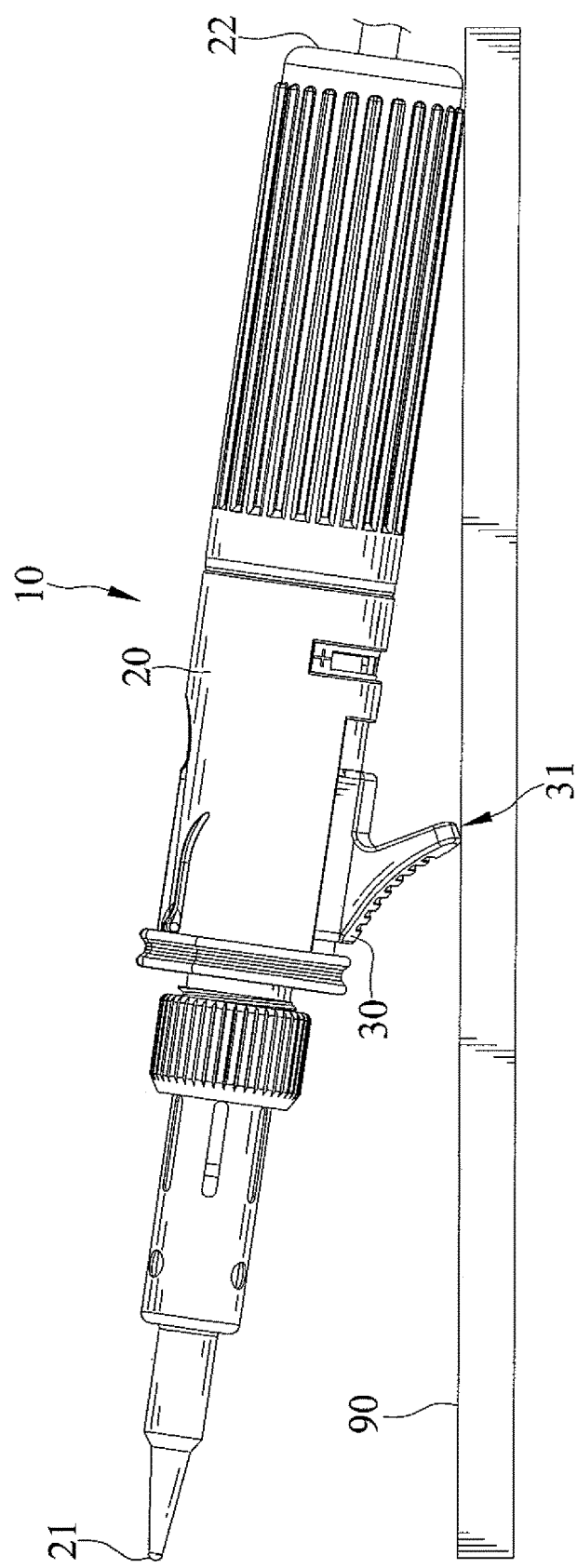
FIG. 5 is a perspective view showing the tool of FIG. 1 in another supported position, with the switch in the ON position.

FIGS. 3 and 5 show that the main body 20, when supported on the surface 90, includes the front end 21 spaced from the surface 90 and the rear end 22 abutting the surface 90 respectively. The main body 20 is supported in an inclined position with respect to the surface 90. The main body 20 of the tool 10 has a center of gravity located between a middle disposed on the first plane P1 and the rear end 22. Therefore, the tool 10 does not overbalance when being supported on the surface 90.

In the embodiment, the tool 10 is a heating tool, the front end 21 is a heated end that is able to supply heat, and the rear end 22 is a heat insulated grip end that is configured to allow a user to grip the tool 10. FIGS. 3 and 5 also show that the front end 21 of the tool 10 is disposed above the surface 90 by the switch 30. Therefore, the front end 21 does not burn the surface 90.

Furthermore, the supporting structure 31 has a front side 313 forming an input portion allowing the user's finger to ergonomically and easily move the switch 30. The front side 313 is inclined with respect to the base 32. The front side 313 includes a plurality of slip stopping structures 314 formed thereon. The plurality of slip stopping structures 314 includes a plurality of ridges and recesses, and two adjacent ridges include a recess disposed therebetween. The plurality of slip stopping structures 314 provides increase friction between the front side and the user's finger.

In view of the forgoing, the switch 30 is adapted to stand on a surface 90 stably, and the main body 20 is able to be supported on the surface 90 by the switch 30. Furthermore, the input portion on the front side 313 of the supporting structure 31 allows the user's finger to ergonomically and easily move the switch 30.

The foregoing is merely illustrative of the principles of this invention, and various modifications can be made by those skilled in the art without departing from the scope and spirit of the invention.

What is claimed is:

1. A tool having switch with support function comprising:
   a main body having a front end and a rear end and extending from the front end to the rear end along an axis; and
   a switch slidably mounted on the main body and slidable between an ON position and an OFF position, wherein the switch is disposed between the front and rear ends of the main body, and wherein the switch includes a base slidably connected to the main body;
   wherein the switch is adapted to stand on a surface stably, and the main body is able to be supported on the surface by the switch, wherein the switch has a supporting structure which projects from the base and extends transversely to the axis, wherein the supporting structure has an abutting end disposed on a first plane which extends transversely to the axis,
   wherein when the switch stands on the surface, the surface bears the switch from the abutting end of the supporting structure, and wherein the abutting end of the supporting structure has at least two standing portions configured to stand on the surface.

2. The tool as claimed in claim 1, wherein the main body, when supported on the surface, includes the front end spaced from the surface and the rear end abutting the surface respectively.

3. The tool as claimed in claim 2, wherein the supporting structure has a front side forming an input portion allowing a user's finger to ergonomically and easily move the switch, and wherein the front side is inclined with respect to the base.

4. The tool as claimed in claim 3, wherein the abutting end of the supporting structure standing on the surface has two points of contact on the surface and with a first contact point disposed on a second plane and a second contact point disposed on a third plane respectively, wherein the second and third planes intersect with the axis, and wherein the second and third planes have an included angle therebetween.

5. The tool as claimed in claim 4, wherein the included angle is in a range between 20 and 40 degrees.

6. The tool as claimed in claim 2, wherein the abutting end of the supporting structure standing on the surface has two points of contact on the surface and with a first contact point disposed on a second plane and a second contact point disposed on a third plane respectively, wherein the second and third planes intersect with the axis, and wherein the second and third planes have an included angle therebetween.

7. The tool as claimed in claim 6, wherein the included angle is in a range between 20 and 40 degrees.

8. The tool as claimed in claim 1, wherein the supporting structure has a front side forming an input portion allowing a user's finger to ergonomically and easily move the switch, and wherein the front side is inclined with respect to the base.

9. The tool as claimed in claim 8, wherein the front side includes a plurality of slip stopping structures formed thereon.

10. The tool as claimed in claim 1, wherein the at least two standing portions of the abutting end of the supporting structure standing on the surface has two points of contact on the surface, with a first contact point disposed on a second plane and a second contact point disposed on a third plane respectively, and wherein the second and third planes intersect with the axis, and wherein the second and third planes have an included angle therebetween.

11. The tool as claimed in claim 10, wherein the included angle is in a range between 20 and 40 degrees.

12. The tool as claimed in claim 1, wherein an outer periphery of the main body is distal to the axis radially at a first distance and the abutting end is distal to the axis radially at a second distance respectively, and wherein the first distance is less than the second distance.

* * * * *